No. 771,581.

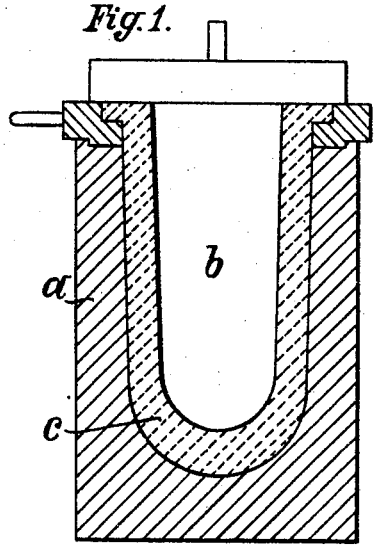
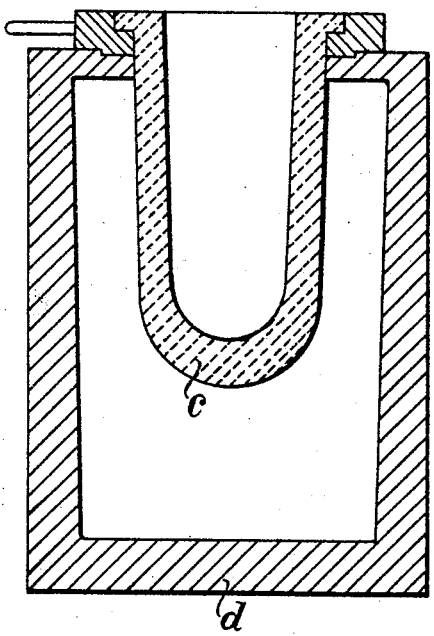
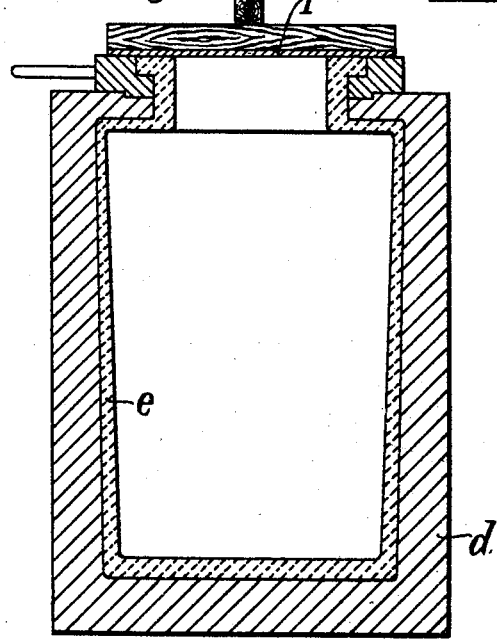

Patented October 4, 1904.

UNITED STATES PATENT OFFICE.

PAUL THEODOR SIEVERT, OF DRESDEN, GERMANY.

PROCESS OF MANUFACTURING HOLLOW GLASS ARTICLES.

SPECIFICATION forming part of Letters Patent No. 771,581, dated October 4, 1904.

Application filed February 25, 1903. Serial No. 144,977. (No model.)

*To all whom it may concern:*

Be it known that I, PAUL THEODOR SIEVERT, a subject of the King of Saxony, and a resident of Dresden, Kingdom of Saxony, German Empire, have invented new and useful Improvements in Processes of Manufacturing Hollow Glass Articles, of which the following is a specification.

A known process of producing certain hollow glass articles consists in first forming a smaller hollow glass body or open-mouthed blank in a press-mold and afterward expanding said body into its final shape by blowing in a second mold. This method, when compressed air is used for the blowing and expanding operation, does not always work to satisfaction, inasmuch as the compressed air, entering by jerks or starts, is liable to cause a too sudden expansion of the hollow body or blank previously formed by the press process, and thereby to produce an irregular distribution of the mass of glass in the finished article.

The object of the present invention is to avoid such irregularities; and it consists in this, that instead of using compressed air for finally expanding or blowing the preliminarily-pressed hollow glass body or blank in the second or finishing mold I apply at the open mouth of said body or blank while it is in the latter mold a moist closure, the moisture in which is caused by the heat contained in the glass itself to be converted into steam, which forms the pressure agent for expanding the glass body into the final shape in the same manner as is set forth in the United States Patents Nos. 637,038 and 637,899 for blowing out or expanding a glass bulb or sack held by a frame.

This improved process will produce a gradual expansion or blowing out instead of a sudden expansion or blowing out of the preliminarily-pressed hollow glass body or blank into its final shape, because the moist closure, which may be of the form of a simple cover, may repeatedly be put on the upper rim of the final mold and blank for a longer or shorter period of time and may be put on more or less firmly or tightly, while the mass of glass by its own weight sinks down into the final mold. As said closure may be easily worked or handled by the operator, the latter may continuously observe or watch how far the hollow glass body is advanced in its formation within the final mold, and the operator may exert his influence upon this formation by more or less quickly applying the closure or by more or less firmly pressing it on the rims of the final mold and blank. By this method a much better distribution of the glass will be obtained than by blowing out or expanding by compressed air, which latter will enter the hollow glass body by jerks or starts.

In order to explain more fully the above-specified improved process for manufacturing hollow glass articles, I refer to the annexed drawings, in which a method of working the improved process is illustrated by way of example.

Figure 1 is a transverse vertical section of the preliminary press-mold, the plunger employed therein, and the hollow glass blank formed therein by the plunger; Fig. 2, a transverse vertical section of the finishing-mold, having placed within it the hollow glass blank which has been formed by the press-mold and plunger; Fig. 3, a similar section of the finishing-mold, having the moist closure applied and having represented within it the finished hollow article, a bottle.

$a$ is the press-mold, $b$ the plunger, and $c$ the hollow glass blank produced by said mold and plunger.

$d$ is the finishing-mold, $f$ the moist closure, and $e$ the blown and finished article in the mold $d$.

The moist closure $f$ may be of any material capable of retaining moisture and of resisting the pressure of the steam generated by the heat of the glass in the mold. It is represented as of wood faced with asbestos.

What I claim as my invention is—

The within-described process of manufacturing hollow glass articles which consists in first forming from liquid glass a hollow open-mouthed blank, next placing said blank in a mold of the desired shape for the exterior of the finished article, and afterward applying to the mouth of the blank in said mold, a moist closure from the moisture in which steam is generated by the heat of the blank for expanding the latter within the mold.

In testimony that I claim the foregoing as my invention I have signed my name, in presence of two witnesses, this 10th day of February, 1903.

PAUL THEODOR SIEVERT.

Witnesses:
PAUL E. SCHILLING,
PAUL ARRAS.